(No Model.)
J. W. FRYLING.
FISHWAY.
No. 507,535. Patented Oct. 31, 1893.
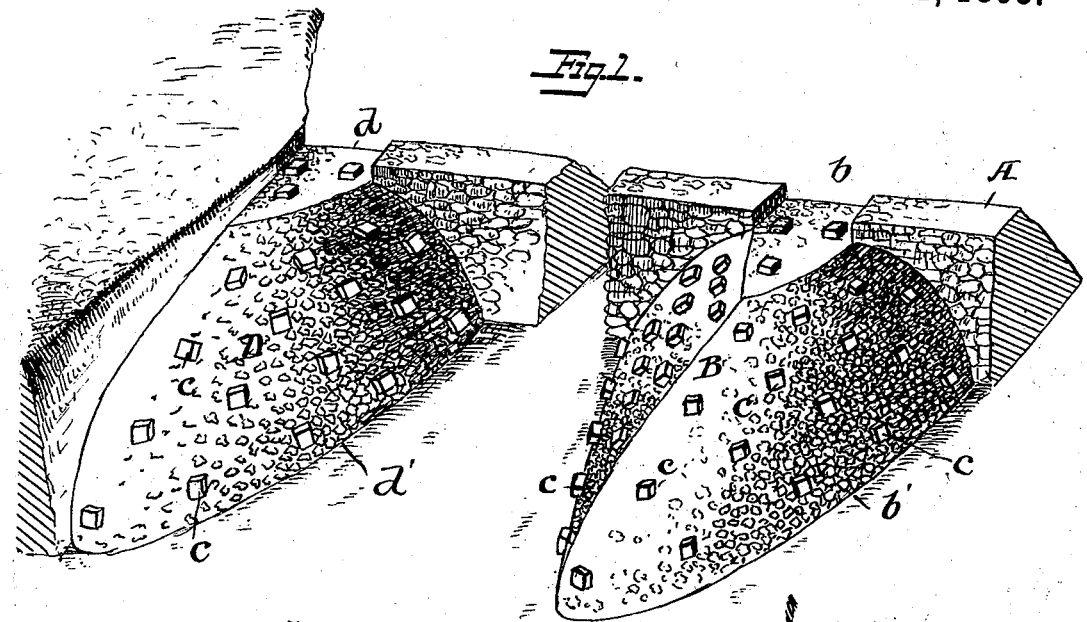
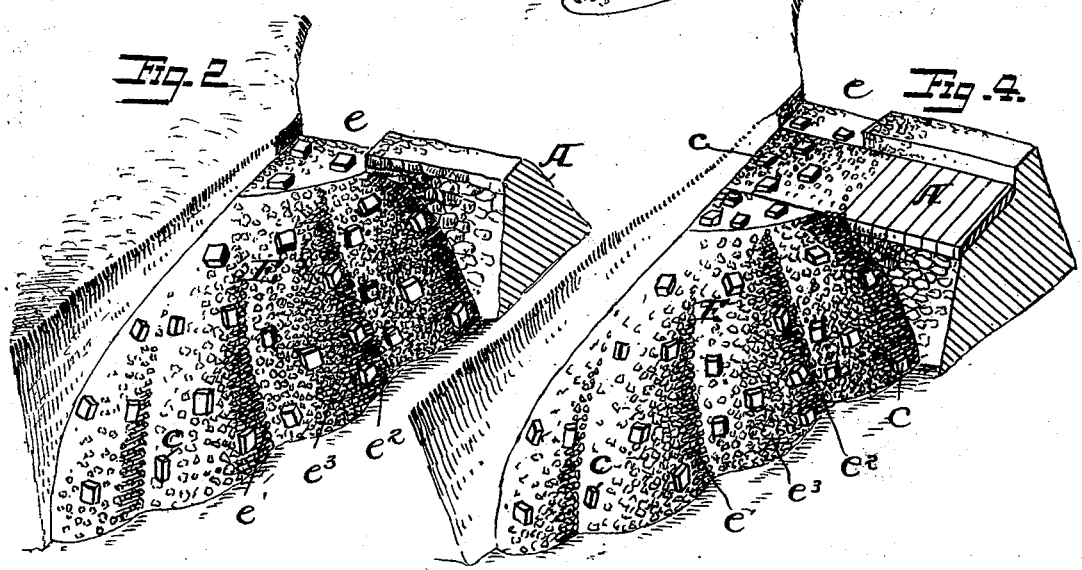
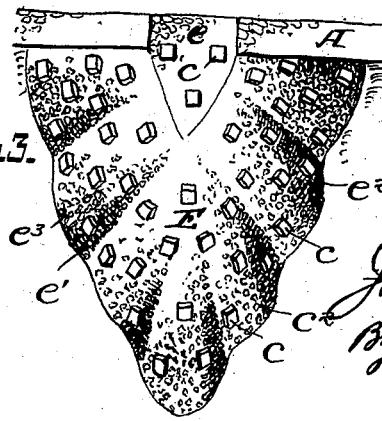
Witnesses
Inventor
John Wesley Fryling
By J. A. Watson
Attorney

UNITED STATES PATENT OFFICE.

JOHN WESLEY FRYLING, OF SUNBURY, PENNSYLVANIA.

FISHWAY.

SPECIFICATION forming part of Letters Patent No. 507,535, dated October 31, 1893.

Application filed March 27, 1893. Serial No. 467,755. (No model.)

*To all whom it may concern:*

Be it known that I, JOHN WESLEY FRYLING, a citizen of the United States, residing at Sunbury, in the county of Northumberland and State of Pennsylvania, have invented certain new and useful Improvements in Fishways, of which the following is a specification.

My invention relates to fish-ways or devices for enabling fish to pass over dams or natural falls. It is well known that before the introduction of dams for purposes of navigation in many of our rivers and streams large numbers of fish migrated annually to the head waters of the streams. Among these were food fishes such as shad and herring and the river fisheries furnished quantities of valuable fish and employed a large number of persons. Many fish-ways have been devised to enable the fish to pursue their journeys up the streams and a number of them have been put to practical tests but the fact that the old time fisheries no longer exist and the fish are not found in the upper waters of the rivers proves that so far artificial fish-ways have not been very successful in accomplishing the object for which they are used. After long study of the habits of various kinds of river fish, and practical experiments in various kinds of fish-ways I have produced a fish-way which answers the purpose admirably, enabling fish to pass dams or falls of any height with ease.

One of the objections to fish-ways hitherto used is that they are too artificial in their construction and for this reason the fish of the shyer varieties shun them. Another objection is that they usually consist of narrow sluice ways which are not easily found by the fish in their efforts to go up stream. I have overcome these and other defects in my improved fish-way which is illustrated in the accompanying drawings, which form a part of this specification, and in which—

Figure 1 is a perspective view of part of a breast dam showing one of my improved fish-ways in the middle of it and another at one end. Fig. 2 shows a similar view of another form of the fish-way at one end of a breast dam. Fig. 3 is a plan of a fish-way suitable for the middle of a dam, and Fig. 4 is a view similar to Fig. 2, showing the invention applied to an apron dam.

My improved fish-way consists of an open inclined surface connecting the bed of the stream below the dam with the crown of the dam so that there will be no vertical fall. The slope of the incline is about two and one-half feet horizontal to one foot vertical, these being the proportions which I have found to work most satisfactory. At the head of the incline the dam is preferably notched or cut away so as to get a supply for the fish-way at low water. When the fish-way is in the middle of the river its surface is inclined in all directions, away from the notch so as to present a large base which cannot be missed by the fish. If the fish-way is located at one end of the dam it is sloped both down stream and toward the middle of the river which gives it a long lower edge.

Referring to Fig. 1 A indicates a breast dam, and $b$ $d$ notches cut respectively near the middle end at one end. B indicates a double inclined surface sloping from the notch $b$ down stream and toward either bank, thus giving it an extensive base line $b'$. The incline B is preferably formed of stone, or of other material rip-rapped with stone, and on its surface are a number of projections or rests $c$. These rests are preferably blocks of stone projecting about two feet above the surface of the rip-rap and they should be about two feet square and four feet apart. They are placed in more or less horizontal rows which rows may be about five feet apart, and the rests in each row are opposite the spaces between the rests in the adjoining rows. I have used the term "rests" for the reason that the blocks or projections form resting places for the fish. I have found that in climbing it is natural for them to proceed a certain distance and then rest awhile before going farther, and one of the principal objects of the invention is to provide suitable resting places to aid the fish in climbing. D indicates the surface of a fish-way at one end of the dam which surface is approximately triangular and presents a long base line $d'$ which the fish are sure to find as they work back and forth under the dam. On this surface are formed rests $c$ similar to those described above.

In Figs. 2, 3 and 4 I have shown the preferred form of my invention in which A indicates the dam and e the cut away portion at the head of the fish-way. In these figures the inclined surface E of the fish-way is irregular and provided with valleys $e'$, $e^2$, and intermediate ridges $e^3$. This form of my invention is best adapted for either high or low water. The valleys are so arranged that the water will be concentrated in them when it becomes very low and will afford the fish a climbing place as long as there is water passing over the fish-way. When the water becomes high it will mostly run over the sides of the fish-way and the fish can pass up the valleys nearest the nose or point where the water will be comparatively shallow. The valleys may be of any desired number but I prefer to have one of them intercept the bulk of the water when it is low so that the best effect may be obtained with a small amount of water. When the water is high all of the valleys and in fact the whole surface E would come into use. Some of the rests $c$ are placed about a foot from the middle of the valleys and arranged alternately.

In operation the water strikes against the upper rests and it is there broken up and divided and continuing its course it strikes against the rests of the next series on account of their being placed alternately with the rests of the first series. In this way the water is kept in a broken or "white" condition, and it never attains a great velocity. At the upper sides of the rests the water temporarily comes to a stand still, or the currents are broken so as to form suitable resting places for the fish.

In the forms shown in Figs. 2, 3 and 4 rests are placed upon opposite sides of and close to the valleys and the water striking first one and then the other will tend to cross and recross the valleys while at the same time sufficient water will be found in the valley to form a clear swimming place for the fish. The fish can therefore swim straight up the valley as far as their strength will carry them, and when tired they can rest by turning to one side or the other and taking advantage of the projections or resting places provided for them.

Having described my invention, what I claim, and desire to secure by Letters Patent, is—

1. In a fish-way the combination with a dam or similar obstruction of an open inclined surface sloping from the crown of the dam down stream and toward one or both banks, the said surface being provided with rests or projections suitably arranged upon its surface, substantially as described.

2. In a fish-way the combination with a dam or similar obstruction of an open inclined surface sloping from the crown of the dam down stream and toward one or both banks, the said surface being provided with rests projecting abruptly upward from its surface, said rests being arranged substantially in rows, the rests in each row alternating with the rests of the adjacent rows, as set forth.

3. In a fish-way the combination with a dam or similar obstruction, of an open inclined surface sloping from the crown of the dam down stream and toward one or both banks, the said surface being provided with one or more valleys and rests which are placed alternately upon opposite sides of the valleys, substantially as described.

In testimony whereof I affix my signature in presence of two witnesses.

JOHN WESLEY FRYLING.

Witnesses:
URIAS BLOOM,
J. F. SCHAFFER.